United States Patent

[11] 3,586,119

| [72] | Inventors | Michael Chuchua<br>Fullerton;<br>George D. Greer, Hollywood, both of, Calif. |
|---|---|---|
| [21] | Appl. No. | 744,114 |
| [22] | Filed | July 11, 1968 |
| [45] | Patented | June 22, 1971 |
| [73] | Assignee | Dale Gardner and Michael Chuchua, by said Greer<br>part interest to each<br>Continuation-in-part of application Ser. No. 569,482, Aug. 1, 1966, now abandoned. |

[54] POWER TRAIN AND TRAILER
6 Claims, 21 Drawing Figs.

[52] U.S. Cl. .................................................. 180/14,
180/12, 180/24.02, 180/45, 280/80, 280/91, 296/23, 308/6
[51] Int. Cl. ...................................................... B60d 7/00
[50] Field of Search............................................ 180/11, 12, 14, 45; 280/80 B, 91; 296/23, 23 MG, 23.6; 280/34, 34.1

[56] References Cited
UNITED STATES PATENTS

| 1,803,866 | 5/1931 | Patterson ..................... | 180/14 |
| 2,001,619 | 5/1935 | Levoyer ....................... | 296/23 (.6) |
| 2,029,540 | 2/1936 | Porteous ...................... | 280/91 UX |
| 2,156,601 | 5/1939 | Mosling et al. ............... | 180/45 X |
| 3,393,922 | 7/1968 | Adams ......................... | 296/23 X |
| 3,411,600 | 11/1968 | Loving et al. ................. | 180/14 |
| 3,420,566 | 1/1969 | Obra ............................ | 296/23 (MC) |

FOREIGN PATENTS

| 604,306 | 7/1948 | Great Britain................ | 180/11 |
| 832,020 | 2/1938 | France ......................... | 180/11 |

*Primary Examiner*—A. Harry Levy
*Attorney*—Harris, Kiech, Russell & Kern

ABSTRACT: A two-wheeled house trailer and a four-wheeled power train for partially carrying and drawing the same, with connecting means for rigidly connecting the same together for transit of the combined power train and trailer but readily detachable to permit use of the power train separate from the trailer.

PATENTED JUN22 1971 3,586,119

INVENTORS.
MICHAEL CHUCHUA,
GEORGE D. GREER,

By their Attorneys
HARRIS, KIECH, RUSSELL & KERN

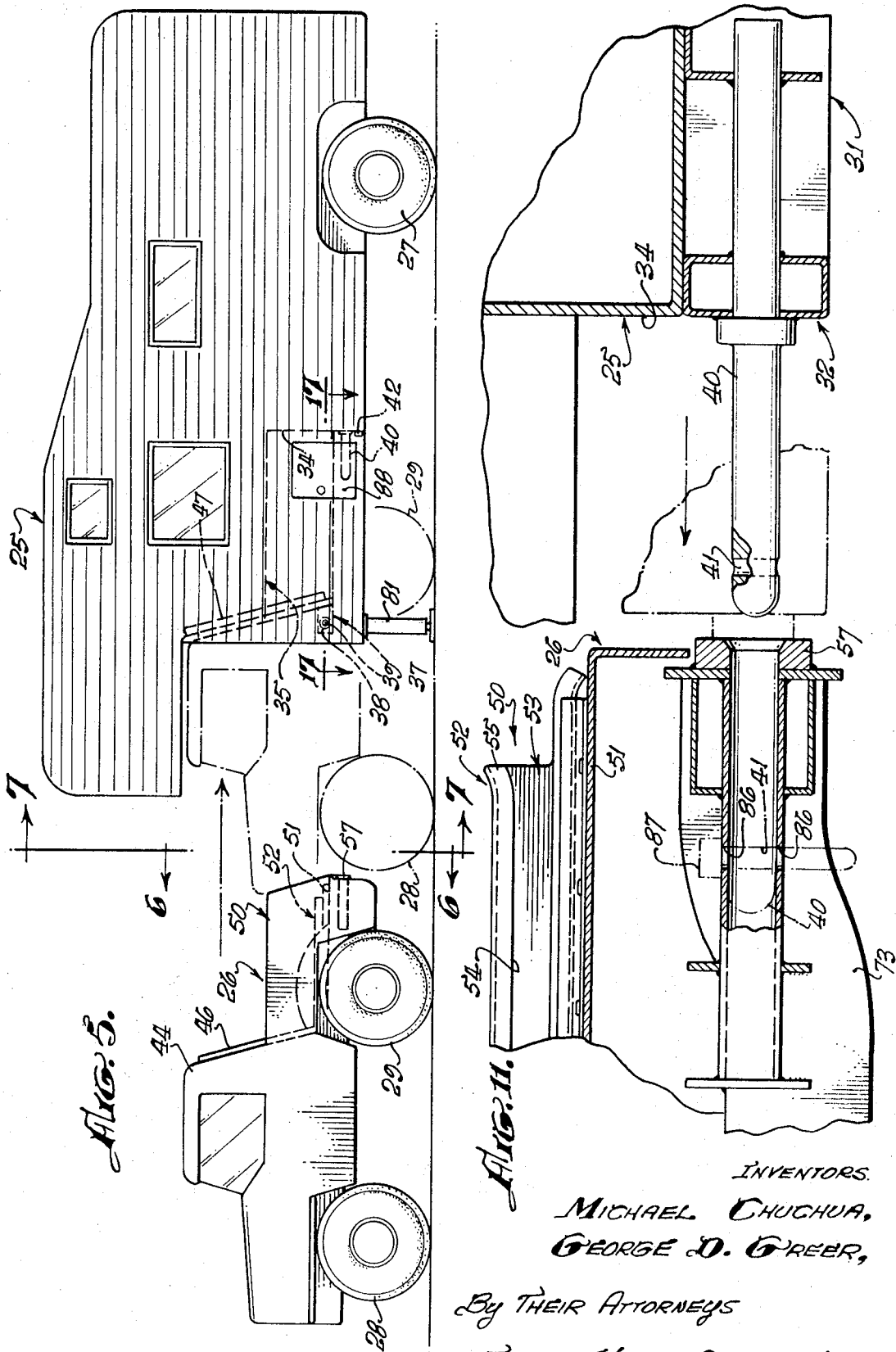

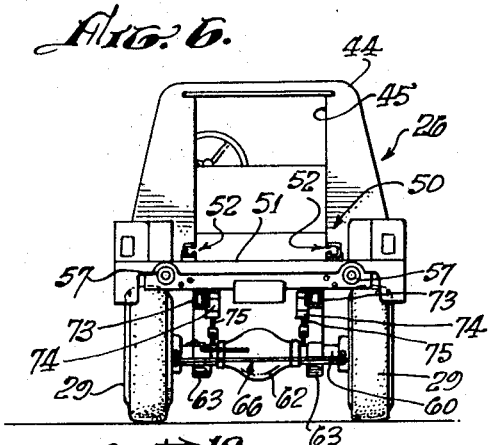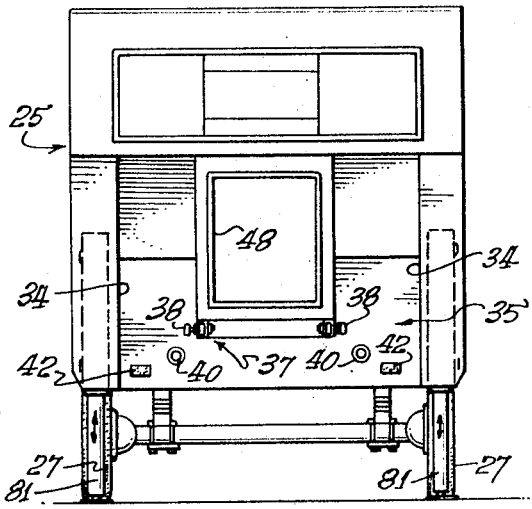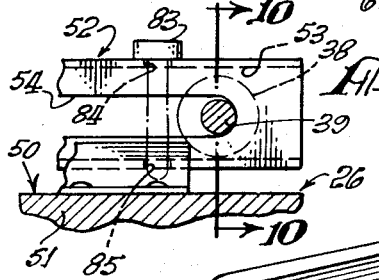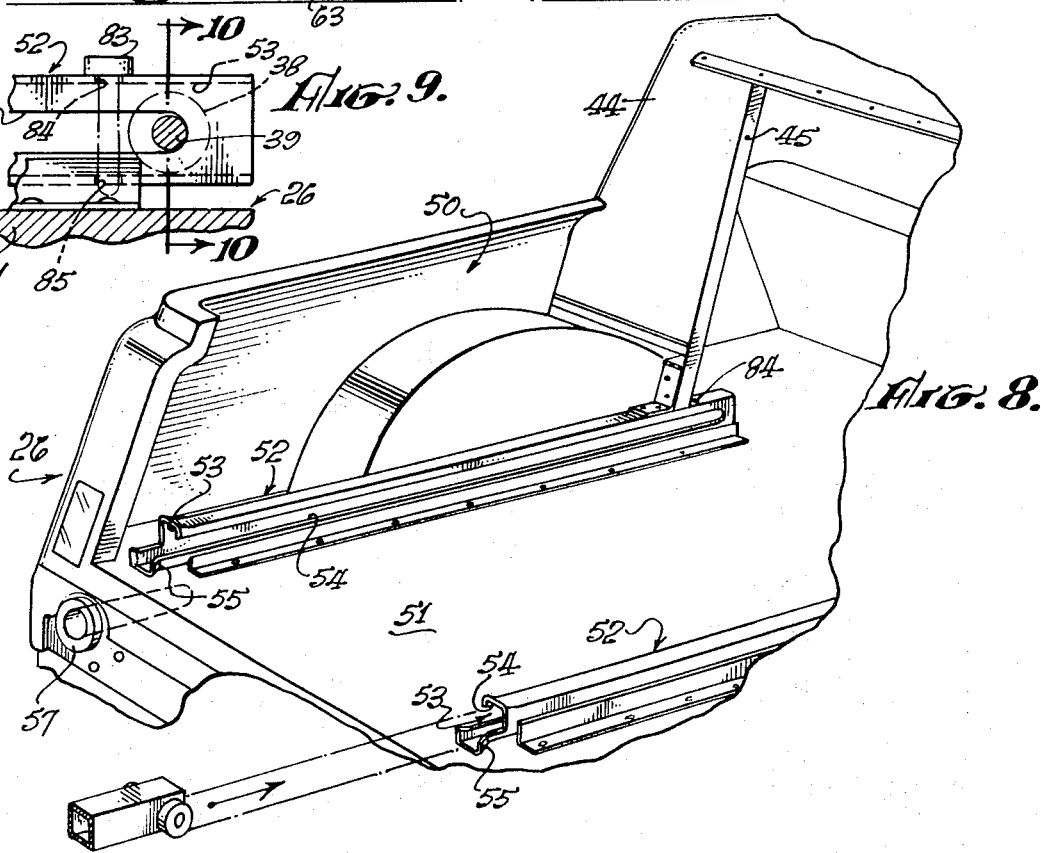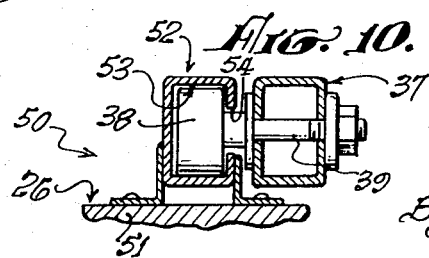

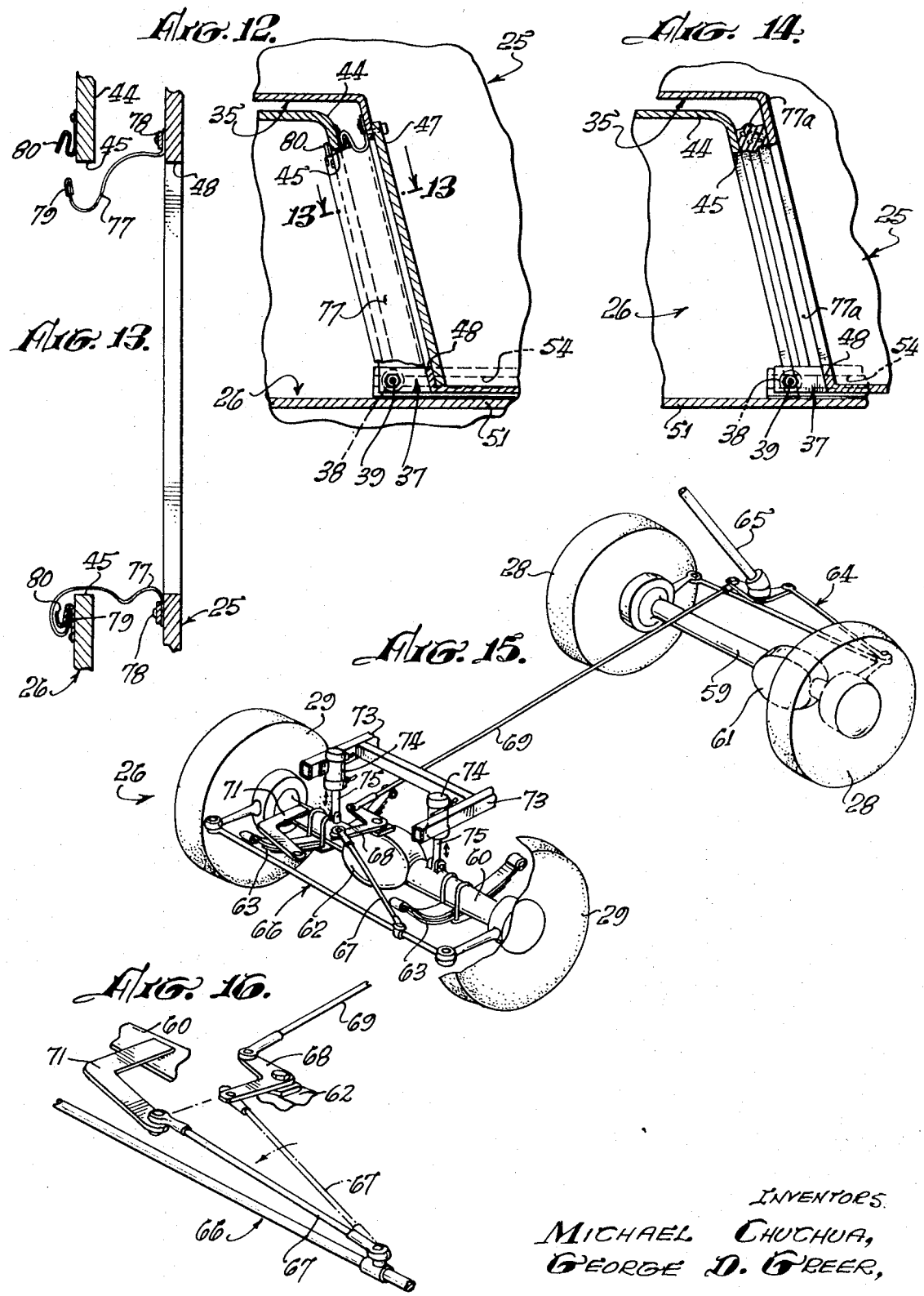

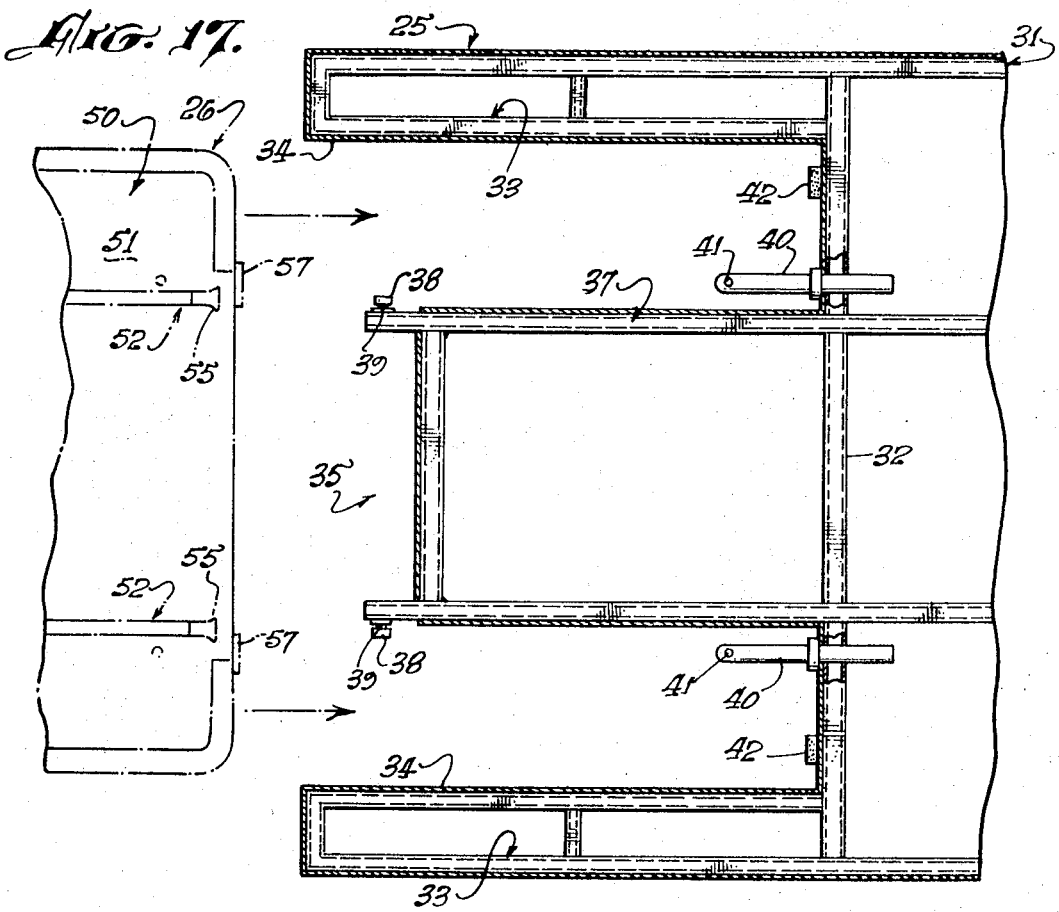
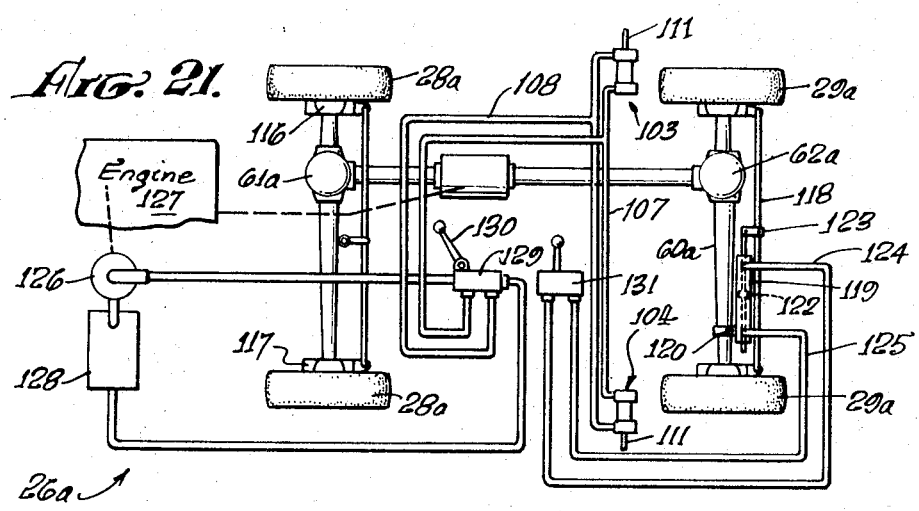

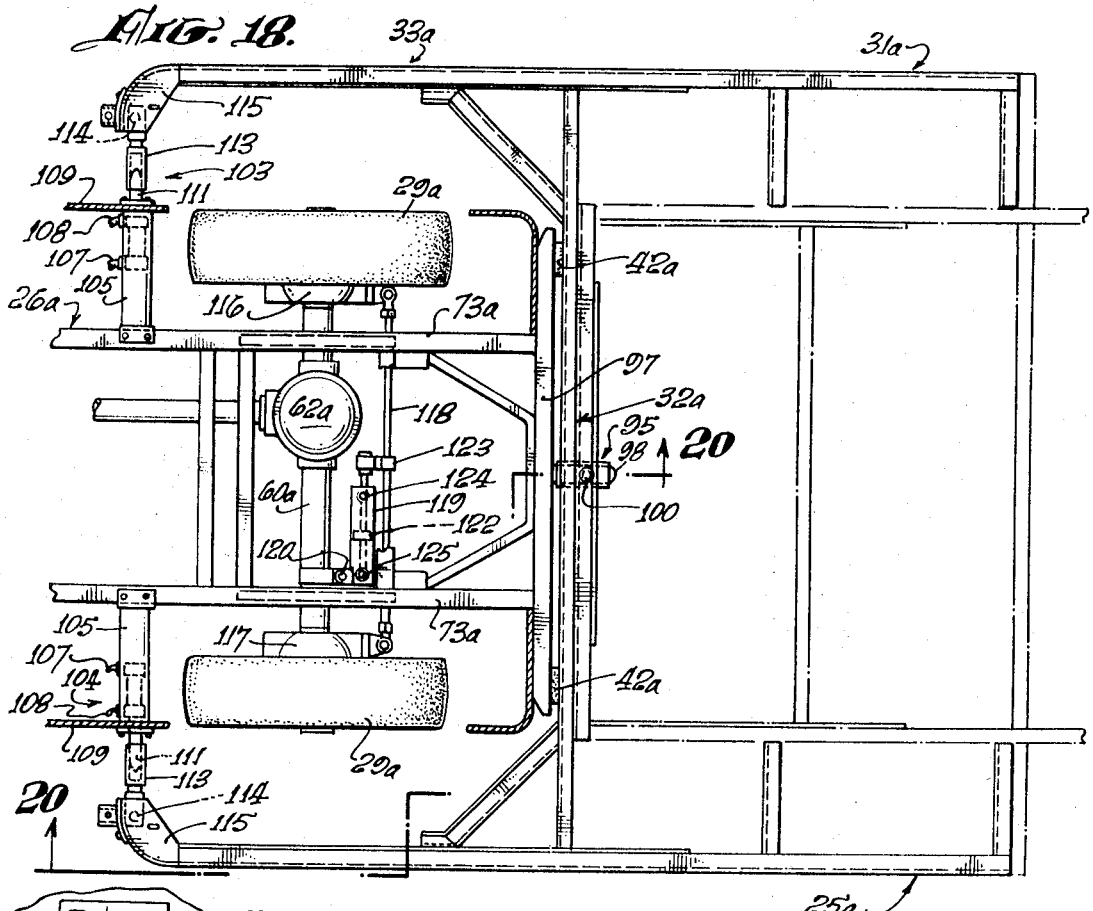
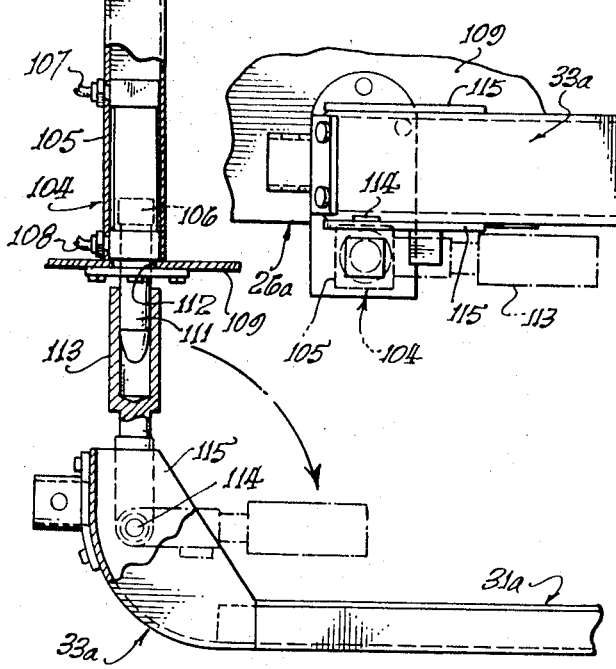
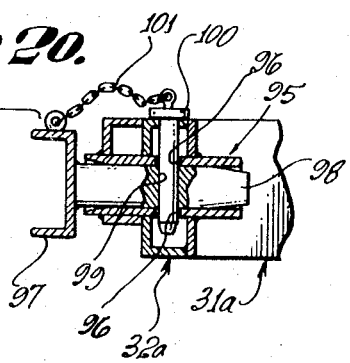

POWER TRAIN AND TRAILER

This is a continuation-in-part of our copending application Ser. No. 569,482, filed Aug. 1, 1966, now abandoned.

The present invention relates to a power train and trailer, and, more particularly, to a novel power train and novel trailer and means for detachably connecting the same so as to control relative movement therebetween. It is primarily designed for application to a generally conventional house trailer and a generally conventional power train such as a "Jeep" or pickup truck, and will be described in connection therewith, although we do not intend to be limited thereto because the invention can be applied to other types of power trains and trailers. The term "trailer" is intended to include any and all forms or types of trailer vehicles which may be drawn, including those vehicles which are partially carried as well.

A common type of conventional house trailer has supporting wheels on each side thereof located at or near the center of the trailer. It is normally drawn by a four-wheeled automotive vehicle, such as a pickup truck, connected to the front of the trailer by a drawbar or coupling means providing a pivotal connection therebetween to permit free relative turning movement between the truck and trailer. Such conventional truck and trailer combinations have many serious disadvantages. For example, the simple pivotal coupling therebetween is subject to failure or breakage during travel, presenting a serious road hazard. Also, such simple pivotal coupling permits the trailer to whip, swerve, or sway during travel, particularly at higher speeds, and permits the truck and trailer to jackknife relative to each other under some conditions of operation, creating further hazards. Furthermore, such conventional coupling requires an undesirably large turning radius for the combination truck and trailer. Also, under many state laws it is illegal for passengers to ride in such a conventional house trailer during transit, and it is impossible for a passenger to pass from the truck to the trailer, or visa versa, during transit.

It is a primary object of this invention to obviate the foregoing, and other, disadvantages of such conventional truck and trailer combinations. We accomplish this by rigidly, but detachably, connecting such a trailer to a four-wheeled automotive draft vehicle, commonly known as a power train.

Another object of the invention is to provide such a combination of power train and trailer in which the rear wheels of the power train are steerable in concert with the front wheels thereof, or in which the such rear wheels may be locked in parallelism with the longitudinal axis of the power train and independent of such front wheels, or in which such rear wheels are conventionally fixed and independent of such front wheels.

A further object of the invention is to provide such a combination in which the wheels of the trailer are steerable in concert with the steering of the front wheels of the power train.

A further object of the invention is to provide a four-wheeled power train, for use with such a trailer, in which the rear wheels of the power train may be freely turnable relative to the body thereof or rigidly fixed relative to such body, as desired.

A further object of the invention is to provide novel coupling means for detachably connecting a power train to a trailer.

Still another object of the invention is to provide such a combination in which the power train has an enclosed cab with a door in the rear thereof which is adapted to cooperate with a door in the front of the trailer to permit human passage between power train and trailer. Another object is to provide such a device in which readily detachable sealing means is provided between power train and trailer and around said doors.

A further object of the invention is to provide such a combination in which the rear wheels of the power train may be lifted off of the ground or other supporting surface when the power train and trailer have been rigidly connected together for transit. Other and further objects and advantages of the invention will appear from the following specification and the drawings, which are for the purpose of illustration only, and in which:

FIG. 5 is a side elevational view of the invention;

FIG. 6 is a rear elevational view of the power train of the invention;

FIG. 7 is a front elevational view of the trailer of the invention;

FIG. 8 is a perspective view of the rear of the power train of the preferred embodiment of the invention;

FIG. 9 is an enlarged fragmentary longitudinal sectional view of a detail of the invention;

FIG. 10 is an enlarged fragmentary cross-sectional view of a detail of the invention;

FIG. 11 is an enlarged fragmentary longitudinal sectional view of details of the invention;

FIG. 12 is a fragmentary longitudinal sectional view of the communicating doors of the invention;

FIG. 13 is an enlarged fragmentary sectional view of a portion of FIG. 12;

FIG. 14 is similar to FIG. 12 but of an alternative form of similar detail;

FIG. 15 is a fragmentary perspective view of the wheels and steering gear of the power train connected as illustrated in FIG. 2;

FIG. 16 is fragmentary perspective view of a portion of FIG. 15, but connected as shown in FIG. 3;

FIG. 17 is a fragmentary plan view, partly in section, showing the preferred form of means for connecting the power train and trailer;

FIG. 18 is a fragmentary plan view showing an alternative means for connecting the power train and trailer;

FIG. 19 is a fragmentary horizontal sectional view taken generally on the line 19-19 of FIG. 18;

FIG. 20 is a fragmentary horizontal view, partly in section, taken on the line 20 of FIG. 18;

FIG. 21 is a diagrammatic plan view of the control mechanism for the power train partly shown in FIG. 18.

Figure 1:
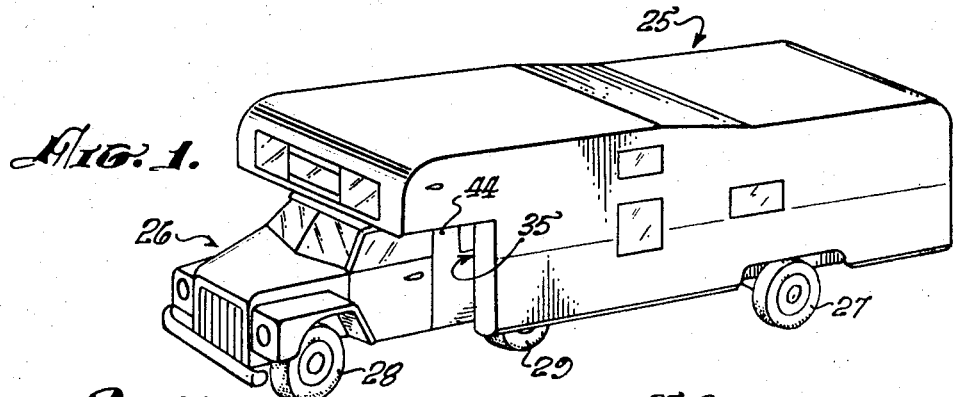
FIG. 1 is a perspective view of the invention.

Referring to the drawings, FIGS. 1 and 5 show a generally conventional house trailer 25 and an automotive draft vehicle or power train 26, preferably of the "Jeep" or pickup truck type. The trailer 25 has a pair of conventional supporting wheels 27 on each side thereof and located rearwardly of the center of the trailer. The power train 26 has a pair of conventional steerable front wheels 28, one on each side of the vehicle, and a pair of rear wheels 29.

As best shown in FIG. 17, the trailer 25 has a conventional supporting frame 31 which includes a transverse frame member 32. Rigidly connected to the main frame 31, or integral therewith, is an auxiliary frame 33 which provides a rectangular and generally U-shaped opening 34 which opens forwardly of the trailer 25 and mates with a rectangular opening 35 in the front of the trailer, to accommodate the rear end of the power train 26, as will be described hereinafter. Also secured to, or integral with, the main frame 31 is a connector frame 37 which extends forwardly of the trailer 25 in the opening 34. As best shown in FIGS. 10 and 17, on each side of the connector frame 37, at the forward end thereof, are rollers 38 rotatably carried on pins 39 rigidly secured to the connector frame. As best shown in FIGS. 11 and 17, the transverse frame member 32 has a pair of forwardly extending pintles 40 rigidly connected thereto, each of the pintles having a vertical hole 41 in the outer end thereof. Also secured on the front of the transverse member 32 are a pair of resilient bumpers 42 which may be rubber, other resilient material, or springs, as desired.

The power train 26 is of generally conventional construction, with the modifications pointed out hereinafter. As shown in FIGS. 1, 5, 12, and 14, it is provided with a cab 44 having a door opening 45 in the rear portion of the cab. An opening type or removable door 46, which is detachably connected to the cab 44 by any suitable means (not shown), is provided to close the door opening 45 when desired. A similar opening-type or removable and readily detachable door or panel 47 is provided for closing a trailer door opening 48 in the front of the trailer.

The rear portion of the body of the power train 26 includes a conventional storage or pickup area 50 which includes a floor 51, as best illustrated in FIG. 8. Fixed to the floor 51 are a pair of parallel tracks 52, each of which has a generally C-shaped opening 53 and an inwardly opening longitudinal slot 54. As illustrated in FIG. 8, the outer ends 55 of the tracks 52 are belled out. As best shown in FIGS. 6, 8, and 11, the rear end of the power train 26 carries a pair of tubular sockets 57 rigidly connected to the power train, the sockets being parallel to each other and spaced apart a distance identical with the spacing of the pintles 40 on the trailer 25.

Figure 2:
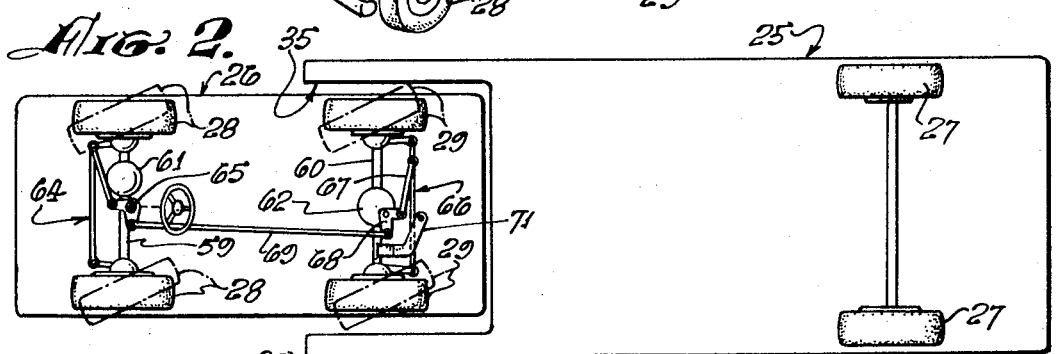
FIG. 2 is a fragmentary diagrammatic plan view showing one embodiment of the invention.

As best shown in FIGS. 2 and 15, the front wheels 28 and rear wheels 29 of the power train 26 are mounted on axles (not shown) journaled in front and rear axle housings 59 and 60, respectively, such axles being connected through conventional differentials 61 and 62, drive shafts, and transmission to the engine of the power train, to provide a conventional four-wheel drive for the wheels of the power train, the details thereof not being shown. The rear wheels 29 are pivotally mounted on their axles in the same manner that the front wheels 28 are mounted on their axles, to provide steerability of both the front and rear wheels 28 and 29. The front and rear axle housings 59 and 60 are conventionally spring mounted on the frame of the power train 26, only the rear springs 63 thereof being illustrated in FIG. 15. The front wheels 28 of the power train 26 have conventional steering linkage 64 connected to the steering column 65 of the power train. The rear wheels 29 have similar steering linkage 66, which is connected to the front wheel steering linkage 64 through a tie rod 67 which is connected to one arm of a bell-crank 68 the other arm of which is connected through a longitudinal tie rod 69 to the front wheel steering linkage 64 so that when the front wheels are conventionally steered the rear wheels are similarly steered and in the same amounts and directions.

Figure 3:
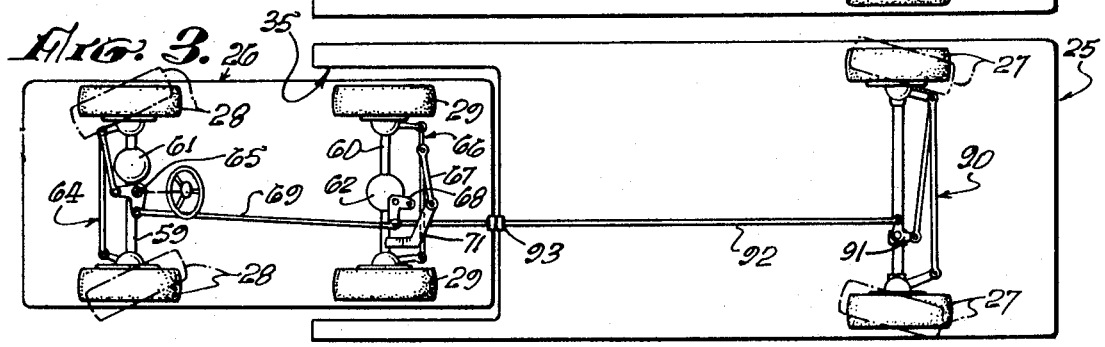
FIG. 3 is a fragmentary diagrammatic plan view showing a second embodiment of the invention.

As best shown in FIGS. 15 and 16, mounted on the rear axle housing 60 is an L-shaped arm 71, to which the tie rod 67 may be connected, as shown in FIGS. 3 and 16, instead of being connected to the bell crank 68 as shown in FIG. 15. When so connected, the rear steering linkage 66 is connected directly to the rear axle housing 60 and is disconnected from the front steering linkage 64, to lock the rear wheels parallel to the longitudinal axis of the power train 26.

As best shown in FIG. 15, the power train 26 has a conventional frame which includes a pair of longitudinal frame members 73 on each of which is rigidly mounted a hydraulic cylinder 74 having a piston rod 75 which is pivotally connected to the rear axle housing 60. The hydraulic cylinders 74 are generally as illustrated in detail in FIG. 19 and have controls as generally illustrated in FIG. 21, which will be described hereinafter. The hydraulic cylinders 74 may be operated to raise the piston rods 75 and draw the rear axle housing 60 upwardly toward the frame member 73 against the compression of the rear spring 63, to raise the rear wheels 29 of the power train 26 off the ground, as will be described in more detail hereinafter.

As shown in FIGS. 12 and 13, a flexible dust seal 77, formed of resilient material, such as rubber or fabric, is provided between the cab 44 of the power train 26 and the trailer 25, around the doors 45 and 48, respectively, thereof when the power train and trailer are connected together as illustrated in FIG. 12, to form a dust seal preventing the entry of dust and foreign material into the trailer and power train during transit. The dust seal 77 is removably connected to the trailer by means of suitable nuts and threaded studs 78 and has U-shaped metal members 79 crimped onto the free edge of the dust seal and space therearound. Carried on the interior wall of the cab 44 and space around the opening 45 are a plurality of spring metal clips 80 into which the metal members 79 may be snapped, as illustrated in the lower half of FIG. 13, to retain the dust seal 77 relative to the cab 44. By this construction, the dust seal 77 may be readily secured between the power train 26 and trailer 25 around the door openings 45 and 48 therein, or disconnected therefrom. In an alternative embodiment as illustrated in FIG. 14, a dust seal 77a of foam rubber under compression, for example, is formed between the cab 44 and the trailer 25 about the doors 45 and 48 when the power train and trailer are connected together. Other forms and types of seals are intended to be within the scope of the invention.

Also connected to the front portion of the trailer 25 are a pair of temporary feet 82, one one each side of the vehicle, which may be pivoted to the trailer for rotation upwardly into a carrying position in which they do not engage the ground or may be pivoted downwardly to the position shown in FIG. 5 to support the forward end of the trailer when the power train 26 is disconnected therefrom.

As shown in FIG. 5, the power train 26 may be free of the trailer 25, as shown in full lines, or may be backed into the trailer to the position of the power train shown in dotted lines therein. As the power train 26 is backed into the trailer 25 the rollers 38 enter the bell mouths on the outer ends 55 of the tracks 52 to guide the power train in its backing into the trailer. As the power train approaches the end of such backing movement, in the position generally illustrated in FIG. 11, continued backing of the power train causes the pintles 40 on the trailer to enter the tubular sockets 57 on the power train to guide the end movement of the backing of the power train into the trailer until the rear end of the power train strikes the bumpers 42 and is cushioned thereby, at which time the rollers 38 will have reached the forward end of the tracks, as indicated in FIG. 9. Safety pins 83 may then be dropped through suitable holes in the tracks 52 matching holes 84 and 85 in the tracks 52 and connector frame 37, as illustrated in FIG. 9, to prevent relative longitudinal movement of the power train and trailer and to serve as a drawbar therebetween. Also, when the power train 26 and trailer 25 are in such connected position, the pintles 40 will have entered into the tubular sockets 57 to their limited position in which the holes 41 in the pintles will be aligned with matching holes 86 in the sockets to permit a safety pin 87 to be dropped therethrough as indicated in dotted lines in FIG. 11, to additionally lock the power train to the trailer and serve as an additional drawbar means therebetween. Other locking connections may also be used such as, for example, a quick-disconnect type of connection with a spring-loaded catch (not shown) for the pintles 40. The holes 84, as illustrated in FIG. 8, are preferably within the cab 44 of the power train 26, for ready access to insert or withdraw the safety pins 83. The trailer 25 is preferably provided with removable panels 88, one on each side thereof, to provide access to insert or remove the safety pins 87. The rollers 38, tracks 52, and safety pins 83 form side connecting means disposed between the power train 26 and the trailer 25 and the pintles 40, tubular sockets 57, and safety pins 87 form axial connecting means disposed between the power train and the trailer, for rigidly connecting the rear portion of the power train to the trailer and in axial alignment therewith, such side-connecting means being disposed forwardly of the rear portion of the power train and forwardly of the axles of the rear wheels 29 of the power train, to stabilize the power train and trailer against relative turning movements therebetween. Other similar forms of coupling means for coupling the power train and trailer together may be employed and are intended to be within the scope of the invention.

As can be seen, when the power train and trailer are connected together, part of the weight of the trailer is supported by the power train. The trailer is, then, partially supported and drawn by the power train. When in transit, there is a rigid connection between the power train and trailer not only to guard against relative horizontal movement but for partial support as well.

An alternative embodiment is illustrated in FIG. 3, in which the rear wheels 27 of the trailer 25 are made steerable similar to the rear wheels 29 of the power train 26 as generally illustrated in FIG. 2. Steering linkage 90, similar to the steering linkage 66 is provided for the rear wheels 27 of the trailer, and includes a bellcrank 91 to which is connected a longitudinal tie rod 92 which is connected to the bellcrank 68 as illustrated in FIG. 3, so that steering of the front wheels of the power train 26 also steers the rear wheels 27 of the trailer 25, but in opposite directions from the direction of turning of the front wheels of the power train, as illustrated in FIG. 3. This has the advantage of permitting the power train 26 and trailer 25, when rigidly connected together as shown in FIG. 1 in which the combined length of the two vehicles is substantial, to be turned in a much shorter radius then would otherwise be possible. The longitudinal tie rod 92 is broken into two parts which are detachably connected together by a suitable coupling 93, to permit separation of the power train 26 from the trailer 25.

Figure 4:
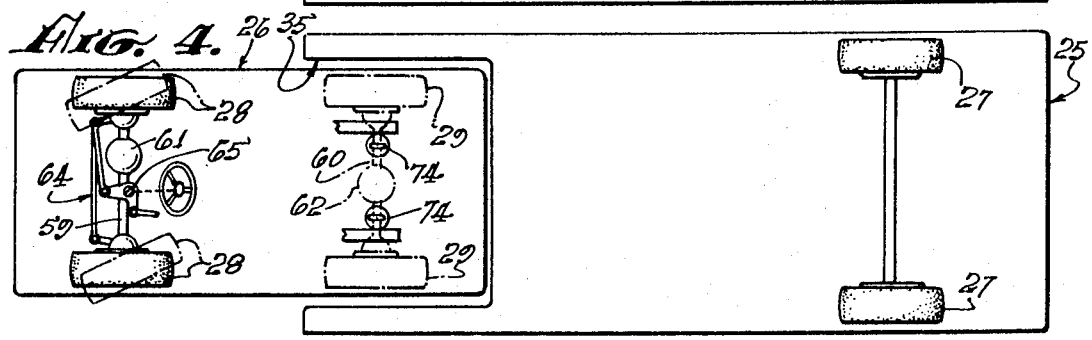
FIG. 4 is a fragmentary diagrammatic plan view showing a third embodiment of the invention.

Thus, as illustrated in FIGS. 2, 3, and 4 various modifications and combinations of the invention may be practiced, as desired. In the modification illustrated in FIG. 2, both the front and rear wheels 28 and 29, respectively, of the power train 26 are steerable in transit, which is desirable to provide a shorter turning radius of the combined vehicle, and to resist side forces between the two vehicles during transit. As shown in FIG. 3, only the front wheels 28 of the power train 26 are steerable, but the wheels 27 of the trailer 25 are also steerable which similarly shortens turning radius of the combined vehicle, which is desirable. As illustrated in FIG. 4, the rear wheels 29 of the power train 26 are not steerable, nor are the wheels 27 of the trailer steerable. In such modified use of the invention, it is desirable to lift the rear wheels 29 of the power train off the ground during transit to eliminate turning forces between the power train and trailer and this is done by means of the hydraulic cylinders 74 which are operated to raise the rear wheels of the power train off the ground.

FIGS. 18, 19, 20, and 21 show a modified form of the invention, in which parts similar to the parts in the preceding views of the drawings are given similar reference numerals, but with the suffix *a* added thereto, for convenience of reference. The trailer frame 31a has an auxiliary frame 33a rigidly secured thereto and extending forwardly therefrom and a transverse frame member 32a on which are mounted a pair of bumpers 42a and a tubular socket means 95 provided with aligned openings 96. The power train 26a has frame members 73a to the rearward ends of which is connected a transverse bar 97 on which is rigidly mounted a rearwardly extending pintle 98 having a hole 99 therein adapted to register with the openings 96 in the socket means 95 when the power train 26a and trailer 25a are connected as illustrated in FIGS. 18 and 20, and the same are locked together by a safety pin 100 which may be connected to the power train by a suitable chain 101. This provides an axial connecting means disposed between the power train 26a and the trailer 25a in axial alignment therewith.

Disposed between the front end of the auxiliary frame 33a and the frame of the power train 26a are front coupling means 103 and 104 which are identical in construction, but reversed in position, and only the coupling means 104 (best shown in FIG. 19) will be described in detail. The coupling means 104 includes a conventional hydraulic cylinder 105 rigidly mounted on a longitudinal frame member 73a of the power train 26a, and including a piston 106 and hydraulic fluid lines 107 and 108 on each side of the piston. The outer end of the cylinder 105 is preferably rigidly connected, for stability, to the body 109 of the power train 26a. Carried by the piston 106 is a connecting pin 111 which is axially aligned with an opening 112 in the body 109 and is adapted to enter a sleeve 113 pivotally connected by a pivot pin 114 to a bracket 115 carried by the forward end of the auxiliary frame 33a. The sleeve 113 may be rotated on its pivot pin 114 from the position shown in full lines in FIG. 19 to that shown in dotted lines therein, for a purpose to be described hereinafter.

The rear wheels 29a of the power train 26a are provided with knuckles 116 and 117 to which are pivotally connected the ends of a transverse rod 118, which maintains the wheels in parallelism but permits them to be turned relative to the rear axle housing 60a, the wheel assemblies being mounted on vertical pivots (not shown) on the axle housing 60a. A conventional hydraulic cylinder 119 is connected by means of a bracket 120 to the rear axle housing 60a, and its piston and piston rod 122 are connected through a bracket 123 with the transverse rod 118. As best shown in FIG. 21, the hydraulic cylinder 119 is provided with conventional hydraulic fluid lines 124 and 125, which communicates with the cylinder on opposite sides of the piston 122.

The hydraulic control system of the power train 26a, illustrated in FIG. 21, includes a conventional pump 126 connected to an engine 127, or other power source, and which is connected between a conventional low-pressure fluid reservoir 128 and a first control valve 129, the latter being manually operable by the operator of the power train 26a through a manual control lever 130, the valve 129 being supplied with hydraulic fluid under pressure by the pump 126. As illustrated in FIG. 21, the hydraulic fluid lines 107 are connected to the inner ends of the cylinders 105 of the front coupling means 103 and 104 and to the first control valve 129. The outer ends of the cylinders 105 are connected through the hydraulic fluid lines 108 to the valve 129. By manual actuation of the control valve 129, high-pressure hydraulic fluid can be directed through the fluid lines 107 to the inner ends of the cylinders 105 and simultaneously connect the outer ends of such cylinders through the valve 129 with the low-pressure reservoir 128, or the valve 129 can direct hydraulic fluid under pressure to the outer ends of the cylinders 105 through the hydraulic lines 108 and at the same time connect the inner ends of such cylinders through the valve 129 with the reservoir 128, to cause the outward and inward movement of the pins 111, respectively, into or out of the sleeves 113. A second manual control valve 131 connects the hydraulic fluid lines 124 and 125, which are filled with hydraulic liquid, and is adapted to open free communication therebetween to permit free movement of the piston and rod 122 in the cylinder 119, to permit free turning of the rear wheels 29a of the power train 26a, or to close communication between the fluid lines 124 and 125 to hydraulically lock the rear wheels 29a in any desired position of turning relative to the axle housing 60a.

As will be understood from the foregoing description, the front wheels 28a of the power train 26a are freely steerable by the operator of the vehicle, as in any conventional four-wheeled automotive vehicle, and the rear wheels 29a may be hydraulically locked in the position shown in FIGS. 18 and 21 in which they are parallel to the axis of the power train, so that when the power train is detached and separate from the house trailer 25a the power train may be independently driven as any conventional four-wheel automotive vehicle.

The power train 26a may be rigidly coupled to the house trailer 25a by first backing it into the auxiliary frame 33a to the position shown in FIG. 18, in which its transverse bar 97 engages the bumpers 42a on the transverse frame member 32a, and in which its pintle 98 is received in the tubular socket means 95, as shown in FIG. 20, in which the pin 100 may be inserted to its position shown in FIG. 20 in which it rigidly latches the rear end of the power train 26a to the auxiliary frame 33a and indirectly to the house trailer 25a. This also serves to align the power train 26a with the house trailer 25a. When the house trailer 25a and power train 26a have been so partially coupled together, the sleeves 113 of the front coupling means 103 and 104 may be rotated to their transverse positions shown in full lines in FIG. 19, from the retracted position illustrated in dotted lines therein, to which they are normally retracted to permit the power train to be backed into the auxiliary frame 33a, the first control valve 129 is manually actuated to supply hydraulic fluid under pressure to the inner ends of the hydraulic cylinders 105 of the front coupling means 103 and 104, to move the pistons 106 and associated connecting pins 111 thereof outwardly into the sleeves 113 to rigidly latch the sides of the power train 26a to the auxiliary frame 33a and house trailer 25a. In such coupled relationship, the power train 26a is, in effect, integral with the house trailer 25a.

We claim:

1. In a vehicle adapted to be drawn and a power train therefor, the combination of:

a vehicle adapted to be drawn, having a length substantially greater than its width, and having supporting wheel means on each side thereof located rearwardly of the front portion of the vehicle;

auxiliary horizontal frame means rigidly connected to said front portion of the vehicle, said frame means extending forwardly from said front portion and including a pair of side members parallel to each other and to the axis of the vehicle, a wheeled and automotively powered power train having a pair of steerable front wheels and a pair of rear wheels, the rear portion of said power train being adapted to fit within said side members and parallel thereto: and side and axial connecting means disposed between said power train and said frame means, and said power train and said vehicle, respectively, for rigidly connecting the rear portion of said power train to said frame means and the front portion of said vehicle in axial alignment therewith, said side connecting means disposed forwardly of said rear wheels of said power train, said side and axial connecting means being readily detachable to permit the relative separation of said power train and said vehicle.

2. A device as claimed in claim 1 wherein said side connecting means are actuated hydraulically, and including control means in said power train and connected to said side connecting means for operating the same.

3. A device as claimed in claim 1 including means for maintaining said rear wheels parallel at all times; and means for locking said rear wheels in any desired lateral position relative to the power train or permitting said rear wheels to turn freely laterally when said vehicle and said power train are connected together.

4. A device as claimed in claim 3 including control means in the power train and connected to the locking means for operating the same.

5. In a vehicle adapted to be drawn and a power train therefor, the combination of:

a vehicle adapted to be drawn, having a length substantially greater than its width, and having supporting wheel means on each side thereof located rearwardly of the front portion of the vehicle;

auxiliary horizontal frame means rigidly connected to said front portion of the vehicle, said frame means defining a rectangular U-shaped space opening forwardly of the vehicle;

a wheeled and automotively powered power train having a pair of steerable front wheels and a pair of rear wheels, the rear portion of said power train being adapted to fit within said space and within the vehicle;

side and axial connecting means disposed between said power train and said frame means, and said power train and said vehicle, respectively, for rigidly connecting the rear portion of said power train to said frame means and the front portion of said vehicle in axial alignment with said power train, said side connecting means including two parallel tracks with generally C-shaped openings rigidly attached to the rear portion of said power train, said tracks having inwardly opening longitudinal slots, two parallel connector frames rigidly attached to the front portion of said vehicle and extending forwardly therefrom, said frames being spaced apart to fit between said tracks, rollers attached to the outside of said connector frames, said rollers adapted to roll in said tracks, and locking means for locking said rollers in said tracks when the rear portion of said power train is connected to the front portion of said vehicle. said side connecting means being disposed substantially forwardly of the rear portion of the power train when the vehicle and power train are rigidly connected together, said side and axial connecting means being readily detachable to permit the relative separation of said power train and said vehicle, said axial connecting means including a plurality of forwardly extending pintles rigidly connected to the front portion of said vehicle, said pintles being parallel to each other and spaced apart, a plurality of parallel tubular sockets rigidly connected to the rear portion of said power train, said sockets being parallel to each other and spaced apart a distance equal to the spacing of the pintles, said sockets adapted to receive said pintles, and locking means for locking said pintles in said sockets whereby the rear portion of said power train is rigidly connected to the front portion of said vehicle.

6. In a vehicle adapted to be drawn and a power train therefor, the combination of:

a vehicle adapted to be drawn, having a length substantially greater than its width, and having supporting wheel means on each side thereof located rearwardly of the front portion of the vehicle;

auxiliary horizontal frame means rigidly connected to said front portion of the vehicle, said frame means defining a rectangular U-shaped space opening forwardly of the vehicle;

a wheeled and automotively powered power train having a pair of steerable front wheels and a pair of rear wheels, the rear portion of said power train being adapted to fit within said space and within the vehicle;

side and axial connecting means disposed between said power train and said frame means, and said power train and said vehicle, respectively, for rigidly connecting the rear portion of said power train to said frame means and the front portion of said vehicle in axial alignment with said power train, said side connecting means including two parallel tracks with generally C-shaped openings rigidly attached to the rear portion of said power train, said tracks having inwardly opening longitudinal slots, and each of said tracks having a vertical hole near its forward end, two parallel connector frames rigidly attached to the front portion of said vehicle and extending forwardly therefrom, said frames being spaced apart to fit between said tracks, rollers attached to the outside of said connecting frames, said rollers adapted to roll in said tracks, each of said connecting frames having a roller attached to the front of said frame on the outside thereof, each of said front rollers being adapted to roll in said tracks, and safety pins which are adapted to pass through the vertical holes in said tracks and behind the front rollers of said connecting frames for locking said rollers in said tracks when the rear portion of said power train is connected to the front portion of said vehicle, said side connecting means being disposed substantially forwardly of the rear portion of the power train when the vehicle and power train are rigidly connected together, said side and axial connecting means being readily detachable to permit the relative separation of said power train and said vehicle, said axial connecting means including a plurality of forwardly extending pintles rigidly connected to the front portion of said vehicle, said pintles being parallel to each other and spaced apart, a plurality of parallel tubular sockets rigidly connected to the rear portion of said power train, said sockets being parallel to each other and spaced apart a distance equal to the spacing of the pintles, said sockets adapted to receive said pintles, and locking means for locking said pintles in said sockets whereby the rear portion of said power train is rigidly connected to a front portion of said vehicle.

This is a continuation-in-part of our copending application Ser. No. 569,482, filed Aug. 1, 1966, now abandoned.